United States Patent [19]

Wilkins et al.

[11] 4,300,462
[45] Nov. 17, 1981

[54] APPARATUS FOR PLANTING SEEDS

[75] Inventors: Dale E. Wilkins, Pendleton, Oreg.;
William J. Conley, Salinas, Calif.

[73] Assignee: The United States of America as represented by the Secretary of Agriculture, Washington, D.C.

[21] Appl. No.: 156,434

[22] Filed: Jun. 4, 1980

Related U.S. Application Data

[63] Continuation-in-part of Ser. No. 43,974, May 30, 1979, abandoned.

[51] Int. Cl.³ ............................................... A01C 5/00
[52] U.S. Cl. ...................................... 111/34; 111/77; 111/89
[58] Field of Search ................... 111/89, 90, 91, 1, 34, 111/74, 77, 78; 221/212; 47/57.6, 1.3

[56] References Cited

U.S. PATENT DOCUMENTS

| | | | |
|---|---|---|---|
| 1,209,138 | 12/1916 | Fuglsang | 111/91 |
| 2,151,414 | 3/1939 | Beemer | 111/34 X |
| 2,622,459 | 12/1952 | Mendez et al. | 221/236 X |
| 2,625,122 | 1/1953 | Carelock | 111/3 |
| 2,675,942 | 4/1954 | Vogelsang | 221/236 X |
| 3,171,371 | 3/1965 | Gray et al. | 111/91 |
| 3,460,492 | 8/1969 | Dickinson et al. | 47/57.6 X |
| 3,705,559 | 12/1972 | Okorokov et al. | 111/91 X |
| 3,872,805 | 3/1975 | Kolk et al. | 111/91 X |
| 4,061,094 | 12/1977 | Cary et al. | 111/89 |

FOREIGN PATENT DOCUMENTS 1564 of 1870 United Kingdom .................. 111/89

OTHER PUBLICATIONS

Jafari, J. V., et al. (1972), "A Precision Punch-Planter for Sugar Beets", *Transactions of the ASAE* (vol., No. Unknown), pp. 569-571.
Heinemann, W. H. et al., (1973), "Experimental Machines for Autodibble Planting", *Transactions of the ASAE*, vol. 16, No. 4, pp. 656-659.

*Primary Examiner*—James R. Feyrer
*Attorney, Agent, or Firm*—M. Howard Silverstein; David G. McConnell; Margaret A. Connor

[57] ABSTRACT

Seeds are punch planted by an apparatus comprising a disk equipped with a plurality of punches rotatably mounted on a frame. The punch disk is eccentrically driven to insure that the punches are perpendicular to the soil surface at all times. A seed disk is rotatably mounted on the frame and communicates with a seed hopper to singulate seeds to the punches.

7 Claims, 9 Drawing Figures

APPARATUS FOR PLANTING SEEDS

CROSS-REFERENCE TO RELATED APPLICATIONS

This is a continuation in part of our co-pending application, Ser. No. 43,974, filed May 30, 1979, now abandoned.

FIELD OF INVENTION

This invention relates to and has among its objects the provision of novel apparatus for planting seeds. Further objects of the invention will be evident from the following description.

DESCRIPTION OF THE INVENTION

The conventional method of planting seeds involves using a plow or diverging blades to open a furrow, placing the seeds therein and using a closure device to cover the seeds with soil. Some seeds, especially lettuce, carrots, onions, celery, cauliflower and the like are sensitive to the surrounding soil environment during germination and emergence and may never emerge because the soil environment in which they are placed is too harsh. Factors such as soil crusting, salt accumulation, low soil moisture, soil compaction, low oxygen concentration, high temperature, low temperature and low light intensity have an adverse effect on seedling emergence. To insure adequate stands of certain crops therefore, excess seed is planted and then thinned to the desired stand. The latter process is a time-consuming and expensive operation.

One solution to the above problem is the dibble (punch) method of planting in which a pointed instrument is used to make holes in the soil and seeds or the like are deposited therein. This method allows precision planting of crops. Experimental machines for punch planting are described in *Transactions of the ASAE*, Vol. 16, No. 4, pp. 656–659 (1973). Two types of machines are discussed—a pneumatic punch planter and a belt-type planter. Neither machine has advanced beyond the experimental stage to commercial use because of certain inherent defects. In the pneumatic planter forward speeds are too slow for practical operation. The pneumatic planting machine can operate at a maximum speed of one mph, whereas efficient planting requires a speed of at least three mph. If the pneumatic planting device is operated at speeds greater than one mph, the hole is misformed and the seeds are scattered. The belt-type planter is ineffective because of belt slippage with respect to the soil surface, which causes the seeds to be misplaced.

An experimental punch planter for sugar beets is described in *Transactions of the ASAE*, Vol. 15, No. 3, pp. 569–571 (1972). This planter has a punch wheel with cones at equal intervals on its periphery, a seed pick-up mechanism, a seed metering device, and a means of ejecting the seed backwards from the groove at approximately the same speed as the forward speed of the planter. Disadvantages of this invention are that the dibbles do not always enter and leave the soil in a precisely vertical position, and are, in addition, conical in shape, thus, holes larger than the size of the seeds are formed; in addition the seeds are not pressed deeply into the soil and thus they are still subject to the harsh conditions stated above. Furthermore, there is no assurance that a single seed will be planted, thus subsequent thinning is necessary.

One solution to the above problem involves forming a deep, narrow hole in the soil with a punch, placing a seed therein and leaving the hole uncovered. The air in the small hole which contains the seed, remains reasonably stable and the soil does not dry out. This results because of the natural soil temperature gradients occurring during the day. The seed germinates and sends its growing tip to the surface without resistance from soil particles. Also, seeds may be planted at a deeper level in the punch method. This places the seeds below the zone of high salt accumulation at the surface. Further, the depth of the seed within the hole is at a level where moisture conditions remain optmum for seed germination for a longer period.

A magnetic seed delivery autodibble planter is described in U.S. Pat. No. 4,061,094 (hereinafter referred to as '094). In the patented apparatus a non-rotating gear is fixed to a frame. A slotted-rimmed wheel with an axis of rotation through the center of the fixed gear is rotatably mounted on the frame. The wheel is equipped with a plurality of smaller rotating (or drive) gears which are planetarily arranged around and communicate with the fixed gear. Each rotating gear is equipped with a punch containing a magnetic tip. As the wheel rotates the drive gears also rotate around the fixed gear. The rotation of the drive gears drives the pivotally mounted punches in and out of the wheel through the slots therein. A seed box is furnished containing seeds coated with a magnetic attracting substance. As the wheel rotates one of the retracted punches passes the seed box whereupon one or more seeds is attached to the tip of the magnetic punch. All but one of the seeds are removed from the tip as it passes out of the seed box. The punch containing the seed travels circularly until near the soil. The punch then drives a hole into the soil, imbeds the seed therein, and withdraws, leaving a small hole with a seed at the bottom.

One disadvantage of the '094 device is that the punches do not enter and leave the soil in a precisely vertical (perpendicular to soil surface) orientation. This results because the bushings at the slots in the rim of the wheel allow the punches to pivot as they enter and exit the slots. As a consequence, the holes made by the punches in the '094 apparatus are larger than the width of the punches and a number of the advantages of punch planting are not fully realized.

Another disadvantage of the prior art device is that the size of the coated seed must be almost as large as the width of the punches in order to obtain satisfactory singulation of the seed to be planted. If the diameter of the seed is less than the punch width, more than one seed is affixed to each punch resulting in the deposit of more than one seed in each hole. After germination of the seeds and growth of the crop plants, a thinning operation is required to reduce the number of plants so that those remaining attain maximum development.

SUMMARY OF THE INVENTION

The invention described herein provides means and apparatus for obviating the above problems. The device of the invention permits precision autodibble planting of single seeds in small uncovered soil holes and is suitable for commercial application.

In the apparatus of the invention a disk equipped with a plurality of punches is rotatably mounted on a frame. It is a particular characteristic of this punch disk that the punches are maintained perpendicular to the soil surface at all times. To accomplish this end the punches are pivotally mounted to the punch disk and the punch disk is connected by pivot bars to an eccentric disk which is rotatably mounted on the frame. A seed hopper is mounted on the frame and communicates with a seed disk, which is rotatably mounted also on the frame. The seed disk is designed to insure that each punch is equipped with only one seed. The seed disk delivers a seed to the tip of a magnetic punch which travels circularly as the punch disk rotates. When the punch reaches the soil, it imbeds the seed therein at the bottom of a narrow hole and then withdraws.

One of the advantages of the apparatus of the invention is that precise planting is realized. The seeds within each row are evenly spaced in a uniform seed drop path and uniform depth, so as to ensure optimum stands of the crop without excess seeding. Consequently, thinning of the crop is unnecessary and savings of time, labor, and seed costs may be realized.

A further advantage of the apparatus of the invention is that efficient planting speeds are possible. The instant apparatus is capable of precision planting at speeds of three mph or more.

Another advantage of the apparatus of the invention is that an individual seed is firmly and deeply placed at the bottom of a small hole. This results because the seed is placed on the tip of the punch and is driven into the soil with the full force of the punch.

A major advantage of the instant device over the '094 apparatus is that the instant punches remain perpendicular to the soil surface at all times because of the eccentric arrangement of the punch disks. Consequently, the present punches enter and exit the soil in a precisely vertial orientation and the resulting holes are uniformly the width of the punches.

Another advantage of the invention is that shorter times are required between planting and seedling emergence than in other modes of seedbed formation and leads to a faster rate and more successful percentage of seedling emergence over known automated planting methods. This is because the seed is firmly imbedded at the bottom of the hole, thus moisture transfers more readily from the soil to the seed, also, other harsh environment factors which effect germination and emergence are obviated.

Another advantage of our apparatus over the patented device is that only one seed is presented to the punches and ultimately planted in our invention. This is accomplished without damage to the seed and with a minimum of seed skipping. Thus, the time-consuming operation of thinning the resulting crop is avoided.

BRIEF DESCRIPTION OF THE INVENTION

DESCRIPTION OF THE PREFERRED EMBODIMENTS

The apparatus of the invention is next described in detail with reference to the attached drawings.

Figure 1:
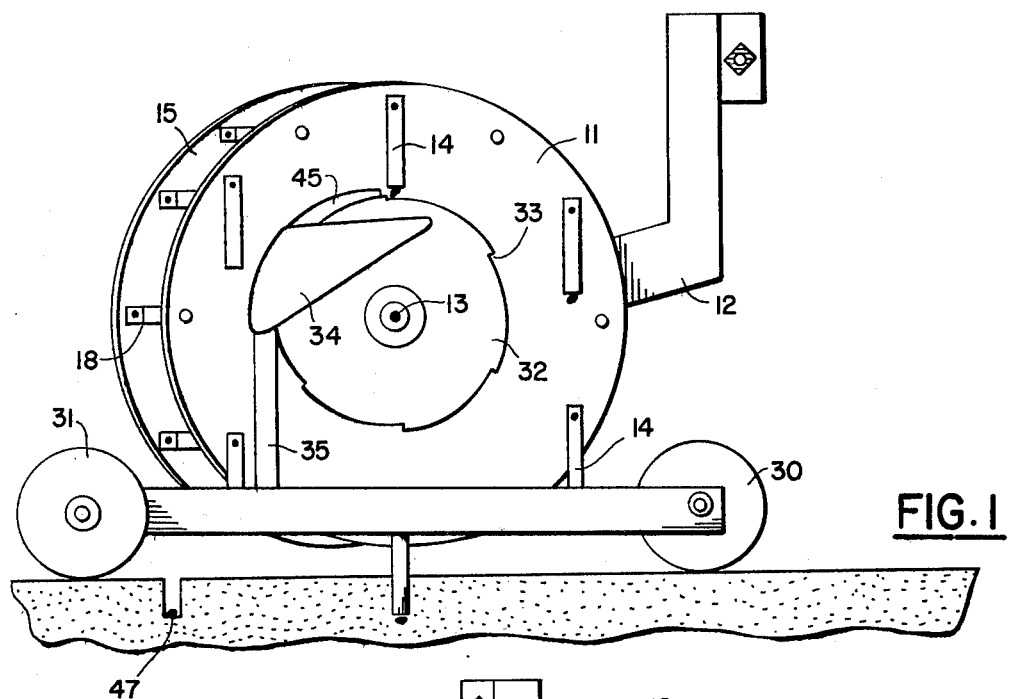
FIG. 1 is a side view of the apparatus of the invention depicting the punch disk.
Figure 2:
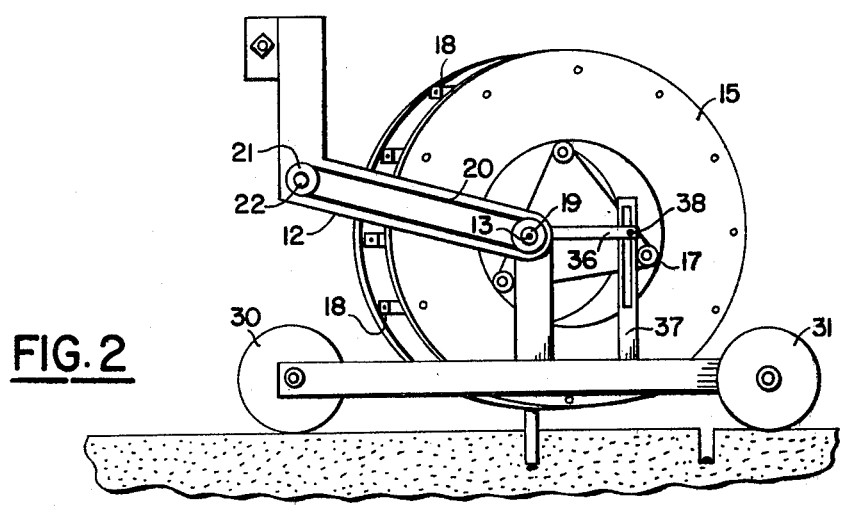
FIG. 2 is a side view of the apparatus of the invention depicting the eccentric disk.
Figure 3:
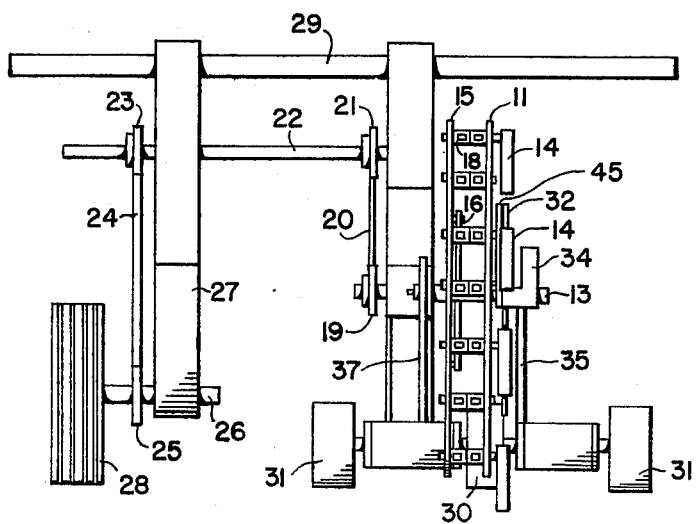
FIG. 3 is a rear view of the apparatus of the invention.
Figure 4:
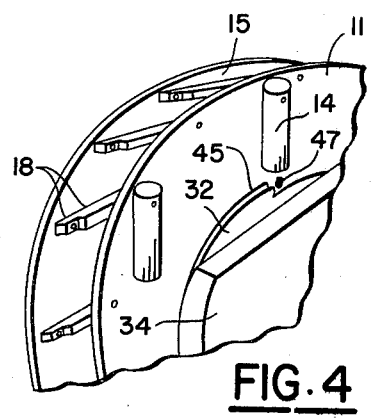
FIG. 4 is a partial view of the instant apparatus taken at an angle from the right rear and depicting the pivot bars.
Figure 5:
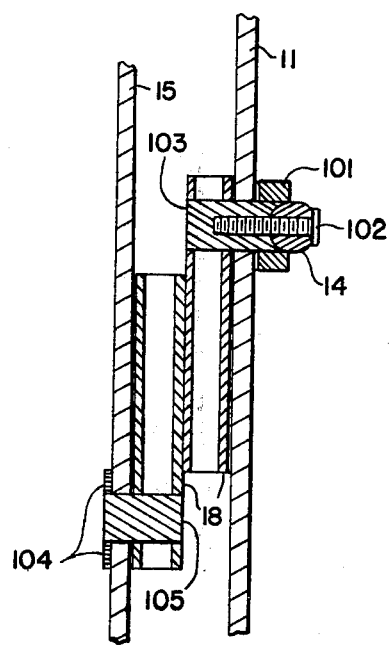
FIG. 5 is a cross-sectional view of a portion of the apparatus of FIG. 3.
Figure 6:
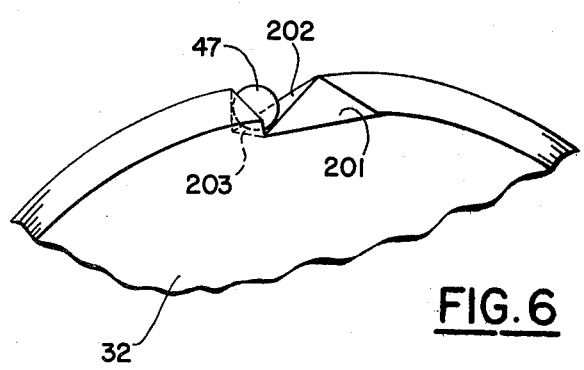
FIG. 6 is a partial view of the instant apparatus depicting the seed singulating mechanism thereof.

Referring to FIGS. 1 and 2, disk 11 is rotatably mounted on frame 12 by means of drive shaft 13. Disk 11 is equipped with a plurality of punches 14 pivotally mounted on 11 and oriented perpendicularly to the soil surface. Disk 15 is rotatably mounted on 12 by means of shaft 13 and on eccentric plate 16 by means of rollers 17. Shaft 13 is rotatably journalled through plate 16. Disk 15 is attached to disk 11 through pivot bars (cranks) 18. Referring to FIG. 5, shafts 103 and 105 are securely fastened to 18 and rotatably attached to disks 11 and 15. Punch 14 is rigidly fastened to shaft 103. Spacers 101 and 104 maintain the lateral position of punches 14 by limiting the lateral movement of pivot bars 18 relative to disks 11 and 15. Bolt 102 securely fastens punches 14 to shaft 103. Sprocket 19 is fixedly attached to shaft 13; chain belt 20 surrounds 19 and sprocket 21, secured to shaft 22. Referring now to FIGS. 1-4, sprocket 23 is fixedly attached to 22 with chain belt 24 linking 23 and sprocket 25. Shaft 26, to which 25 is fixed, is rotatably mounted in subframe 27 and attached to wheel 28. Fixedly attached to 12 and 27 is bar 29, which provides means for attaching the instant apparatus to a tractor or other vehicle to provide forward motion. Wheel 30 is rotatably attached to 12 at the front of the apparatus of the invention and wheels 31 are rotatably mounted on 12 at the rear thereof. Seed disk 32 containing notches 33 corresponding to the number of punches on disk 11 is fixedly attached to shaft 13. Referring to FIG. 6, seed notch 33 is composed of three planes 201, 202, and 203 having the size and angles such that only one seed remains in the notch and is delivered to each punch. Seed hopper 34 is secured to frame 12 by support member 35 and is positioned such that seed disk 32 passes therethrough to obtain seeds for presenting to the punches. Back plate 45 is fixedly attached to seed hopper 34 and secured to frame 12 by support member 35. Arm 36 is rotatably mounted on shaft 13, fixedly attached to 16 and slidably mounted in slotted arm 37, which is secured to frame 12. Adjusting nut 38 provides means for securing 36 in 37.

The operation of the instant device is next described in detail with reference to the attached drawings.

The movement of the tractor to which the device is attached causes wheel 28 which is in contact with the ground to rotate thereby causing sprocket 25 to rotate and drive sprocket 23 through chain belt 24. Rotation of sprocket 23 causes shaft 22 and sprocket 21 to rotate. Sprocket 21 drives sprocket 19 through chain belt 20 and thereby results in rotation of shaft 13 which causes punch disk 11 and seed disk 32 to rotate in the same direction of travel of the apparatus of the invention. Eccentric disk 15 is rotated by the movement of 11 through cranks 18. The speed of rotation of shaft 13 is therefore proportional to the ground speed of the apparatus. The peripheral velocity of disk 11 is adjusted through sprockets 19, 21 23 and 25 so that the relative horizontal velocity between the soil and the punches is as close as possible to zero during the period that a punch is imbedding a seed in the soil. The speed of the punches relative to the ground speed as the punches are in contact with the soil may be increased by increasing the ratio of number of sprocket teeth on sprocket 25 to the number of sprocket teeth on sprocket 23 or to increase the ratio of sprocket teeth on sprocket 21 to the number of sprocket teeth on sprocket 19. Thus, the speed of the punches relative to ground speed at the point of contact is adjusted to zero by selection of sprockets 25, 23, 21 and 19 with the appropriate number of teeth.

As seed disk 32 passes through hopper 34, seed 47 is deposited in notches 33, one seed per notch, and rests against planes 202 and 203 and rubs against back plate 45 as seed plate 32 rotates. If more than one seed falls into notch 33, the surplus will rest on plane 201 which is sloped toward the seed supply and will slide down plane 201 into the hopper. The seed disk then presents the seed to the magnetic tip of a punch as it travels toward the soil surface, the seed being transferred radially from seed notch 33 to the bottom of punch 14 at a point when the punch is at its maximum distance from the soil surface. The seed must be coated with a magnetic attracting substance such as clay containing iron oxide or the like, so that the seed will be transferred by magnetic force to the tip of the punch. The distance between the punch tip and the seed disk must be such as to allow ready transfer of the seed from the seed notch to the magnetic tip.

As 11 rotates, punches 14 bearing their singulated seed are carried around and driven into the soil. Eccentric plate 15 is adjusted by moving arm 36 in slotted arm 37 so that the center of eccentricity is in the horizontal plane of shaft 13, centrally disposed in disk 11. This arrangement insures that punches 14 are adjusted perpendicular to the soil surface at all times. By rigidly fastening the punches perpendicular to cranks 18 and maintaining the center of eccentricity in the horizontal plane of shaft 13, punches 14 are maintained precisely perpendicular to the soil surface during the rotation 11 and especially during their entrance and exit of the soil.

The strength of the soil surrounding the seed must overcome the magnetic attractive forces between the seed and the tip of the punch. The soil conditions should be such that the force of the punch does not cause damage to the seed. Generally, the soil should be moist and tilled prior to use of the apparatus of the invention. Those skilled in the art will be able to determine easily the necessary conditions. The depth of the hole depends on the nature of the soil conditions, the type of seed planted, and the like.

It is within the compass of the invention to employ several punch, seed, and eccentric disks as disclosed in FIGS. 1–9, all mounted on one drive shaft. In this particular embodiment of the invention several rows of seeds can be planted simultaneously. The planting units can be arranged so as to stagger seed implantation in the various rows.

Figure 7:
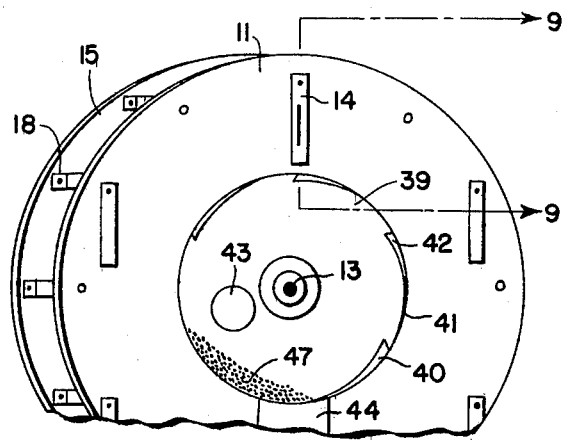
FIG. 7 is a side view of an alternate embodiment of the invention.
Figure 8:
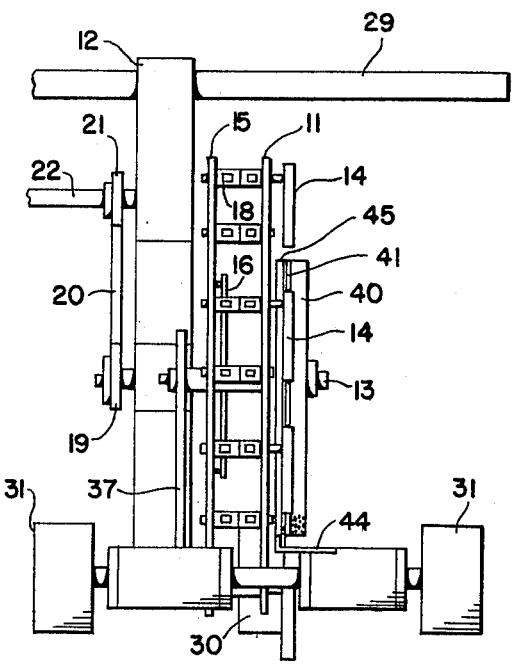
FIG. 8 is a rear view of the embodiment of the invention depicted in FIG. 7.
Figure 9:
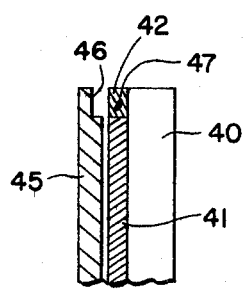
FIG. 9 is a cross-sectional view of a portion of the apparatus of FIG. 7.

FIGS. 7–9, depict an alternate means for singulating seed to the punches. Seed hopper 39 is rotatably mounted on shaft 13. Hopper 39 is composed of outer shell 40 and seed disk 41, which has notches 42 that singularize seed in a manner similar to the notches in seed disk 32. An opening 43 for placing seed into 39 is found in outer shell 40. Fixedly attached to frame 12 by means of support member 44 is back plate 45 equipped with groove 46 at its top most position. Groove 46 is designed to receive one seed (47) from 41 as hopper 39 rotates. The singulated seed is transferred axially from notch 42 in seed disk 41 through groove 46 in back plate 45 to punch 14.

Having thus described our invention, we claim:

1. An apparatus for planting magnetized seeds, comprising in combination
   (a) a frame,
   (b) a punch disk rotatably mounted on the frame and containing a plurality of magnitized punches mounted thereon,
   (c) means for driving said punch disk,
   (d) eccentric means for maintaining the punches on said punch disk perpendicular to the soil surface at all times, said means being eccentrically disposed to said punch disk,
   (e) a seed hopper mounted on said frame, and
   (f) a seed disk rotatably mounted on said frame and communicating with said seed hopper to singulate seeds to said punches, said seed disk containing a plurality of notches corresponding to the number of punches of said punch disk,
   means for driving and carrying said seed disk and said punch disk in timed relation such that said punches and said notches are rotated whereby a respective seed-receiving punch and the seed-carrying notch are in a plane substantially perpendicular to the soil surface and passing through the axis of rotation of said seed disk when said seed-receiving punch is receiving a seed from the seed-carrying notch,
   the distance between said punches and said seed disk being such as to allow ready transfer of the seed from said notches to the punches.

2. The apparatus of claim 1 wherein said eccentric means for maintaining said punches perpendicular to the soil surface comprises a disk pivotally attached to and eccentrically disposed to said punch disk.

3. The apparatus of claim 2 wherein the center of eccentrical disposition is in the horizontal plane passing through the center of said punch disk at the point of its rotational mounting on said frame.

4. The apparatus of claim 1 wherein said seed hopper is rotatably mounted on said frame and said seed disk is fixedly attached to said seed hopper and which further includes a back plate fixedly attached to said frame and communicating with said seed disk to singulate seeds to said punches.

5. The apparatus of claim 1 wherein said notches in said seed disk comprise three planes having the size and angles to singulate seeds to said punches.

6. The apparatus of claim 1 wherein said eccentric means in (d) comprises a disk pivotally attached to said punch disk and rotatably mounted on the frame.

7. The apparatus of claim 6 wherein said disk pivotally attached to said punch disk further includes a plate centrally disposed within said disk, said plate being rotatable on said frame and within said disk.

* * * * *